United States Patent
Park et al.

(10) Patent No.: US 11,655,923 B2
(45) Date of Patent: May 23, 2023

(54) PIPE COUPLER

(71) Applicant: JUNSUNGENC CO., LTD., Daegu (KR)

(72) Inventors: Jun Woo Park, Daegu (KR); Sung Woo Park, Daegu (KR); Jae Won Choe, Daegu (KR); Sang Won Kwon, Daegu (KR); Young Bum Son, Daegu (KR); Jin Hyun Jeon, Daegu (KR)

(73) Assignee: JUNSUNGENC CO., LTD., Daegu (KR)

( * ) Notice: Subject to any disclaimer, the term of this patent is extended or adjusted under 35 U.S.C. 154(b) by 43 days.

(21) Appl. No.: 17/079,762

(22) PCT Filed: Jul. 2, 2019

(86) PCT No.: PCT/KR2019/008049
§ 371 (c)(1),
(2) Date: Oct. 26, 2020

(87) PCT Pub. No.: WO2020/138609
PCT Pub. Date: Jul. 2, 2020

(65) Prior Publication Data
US 2021/0317936 A1    Oct. 14, 2021

(30) Foreign Application Priority Data
Dec. 27, 2018   (KR) .......................... 10-2018-0170363

(51) Int. Cl.
*F16L 25/02*    (2006.01)
*F16L 58/10*    (2006.01)

(52) U.S. Cl.
CPC ......... *F16L 25/023* (2013.01); *F16L 58/1009* (2013.01)

(58) Field of Classification Search
CPC ..... F16L 19/065; F16L 25/023; F16L 19/062; F16L 58/184
See application file for complete search history.

(56) References Cited

U.S. PATENT DOCUMENTS 3,434,745 A * 3/1969 Jackman ................ F16L 37/088
285/321
5,911,443 A * 6/1999 Le Quere ............ F16L 37/0915
285/379

(Continued)

FOREIGN PATENT DOCUMENTS

FR    2794213 A1 * 12/2000 ............ F16L 19/065
KR    200352623 Y1 *  6/2004

(Continued)

*Primary Examiner* — Matthew Troutman
*Assistant Examiner* — Alexander T Rufrano
(74) *Attorney, Agent, or Firm* — Quantum Patent Law Firm; Seongyoune Kang

(57) ABSTRACT

A pipe coupler is capable of preventing a fluid flowing along pipes from coming into direct contact with the pipes made of metal materials, a body, and tie rings, thereby preventing corrosion of the pipes. The pipe coupler is also capable of preventing pipes, even if the pipes made of different kinds of materials are connected, from being indirectly connected to each other by way of a fluid flowing along the inside of the pipes, thereby preventing electric corrosion of the pipes caused by the micro current contained in the fluid. The pipe coupler is also capable of absorbing dimensional differences between the pipes having different sizes.

4 Claims, 12 Drawing Sheets

(56) References Cited

U.S. PATENT DOCUMENTS

| | | | | |
|---|---|---|---|---|
| 5,957,509 | A * | 9/1999 | Komolrochanaporn | ...................... F16L 19/12 285/382.7 |
| 6,517,124 | B1 * | 2/2003 | Le Quere | ............ F16L 37/0915 285/379 |
| 9,068,680 | B1 * | 6/2015 | Crompton | ........... F16L 37/0982 |
| 9,562,637 | B1 * | 2/2017 | Crompton | ............. F16L 21/007 |
| 9,879,810 | B2 * | 1/2018 | Crompton | ............... F16L 58/18 |

FOREIGN PATENT DOCUMENTS

| | | | | |
|---|---|---|---|---|
| KR | 20110047410 | A | * | 5/2011 |
| KR | 101478746 | B1 | * | 1/2015 |
| KR | 101548111 | B1 | * | 8/2015 |
| KR | 102263624 | B1 | * | 5/2020 |

\* cited by examiner

PIPE COUPLER

CROSS-REFERENCES TO RELATED APPLICATION(S)

This patent application is the U.S. National Stage Application of International Application No. PCT/KR2019/008049, filed Jul. 2, 2019 and the entire contents of which are incorporated herein by reference, which claims priority to KR 10-2018-0170363, filed Dec. 27, 2018, and the entire contents of which are incorporated herein by reference.

TECHNICAL FIELD

The present invention relates to a pipe coupler, and more particularly, to a pipe coupler that is capable of preventing, even if pipes made of different kinds of materials are connected thereto, contact corrosion caused by an electric potential difference between the pipes, and absorbing a dimensional tolerance between pipes having different sizes to achieve installation in a simple manner.

BACKGROUND ART

Generally, pipes are arranged for water feeding, water draining, hot water feeding, cooling, heating, gas feeding, and so on, and to do this, they connect facilities located at given positions to one another to provide a path along which a fluid flows. Usually, a cast iron pipe, steel pipe (black gas pipe), galvanized steel pipe (white gas pipe), copper pipe, and the like have been used as the pipe.

So as to allow the fluid passing through the pipe to move to a desired place, without any leaking, a pipe coupler is generally used to extend the pipe or divide the pipe to change the pipe in direction, and accordingly, pipes are connected to each other by means of a screw joint, flange joint, union joint, and expansion joint according to materials and use purposes thereof and work characteristics thereof.

In conventional practices, generally, the screw joint is widely used for connecting the pipes, and in this case, the pipes pass through the pipe coupler and nuts coupled to screws are then compressed against the pipes. When the pipe coupler is connected to the pipes, further, ring-shaped O rings made of a rubber material are located between the pipes and the pipe coupler to prevent the fluid from leaking.

Even if one pair of pipes is connected to the conventional pipe coupler, however, no dimension compatibility exists in the outer diameters of one pair of pipes, thereby frequently causing the fluid flowing along the insides of the pipes to leak to the outside.

So as to solve such problems, pipe connection sockets are disclosed in Korean Patent Nos. 10-1548111 and 10-1555964 wherein a housing and a packing and a tightening nut and an arm ring come into contact with each other by means of their slant surfaces to provide excellent close contact forces, thereby preventing leakage of a fluid. Further, of course, the pipe connection sockets are transformed into arm ring shapes, thereby connecting pipes made of different kinds of materials to each other.

If one pair of pipes is made of different metal materials from each other, however, the pipes connected through the pipe coupler come into indirect contact with each other by means of the fluid, so that undesirably, they may have contact corrosion.

Further, the conventional pipe coupler exerts relatively weak capability in absorbing the dimensional tolerances of the respective parts, thereby having limitations in the dimension compatibility in different outer diameters of galvanized steel pipes, stainless steel SCH pipes, stainless SU pipes, and copper pipes, which are used as the conventional pipes, according to their standardized sizes.

Technical Problem

Accordingly, the present invention has been made to solve the above-mentioned problems, and it is an object of the present invention to provide a pipe coupler that is capable of avoiding a fluid flowing along pipes from coming into direct contact with the pipes made of metal materials, a body, and tie rings, thereby preventing their corrosion, avoiding pipes, even if the pipes made of different kinds of materials are connected, from being indirectly connected to each other by means of a fluid flowing along the insides thereof, thereby preventing electric corrosion caused by the micro current contained in the fluid, and absorbing a dimensional tolerance between the pipes having different sizes, thereby ensuring simple installation.

Technical Solution

To accomplish the above-mentioned object, according to the present invention, there is provided a pipe coupler that is capable of avoiding a fluid flowing along pipes from coming into direct contact with the pipes made of metal materials, a body, and tie rings, thereby preventing their corrosion, avoiding pipes, even if the pipes made of different kinds of materials are connected, from being indirectly connected to each other by means of a fluid flowing along the insides thereof, thereby preventing electric corrosion caused by the micro current contained in the fluid, and absorbing a dimensional tolerance between the pipes having different sizes, thereby ensuring simple installation, the pipe coupler including: a body 100 having connectors 100a and 100b corresponding to at least two or more pipes 10 inserted thereinto in such a manner as to allow the pipes 10 to be connected thereto, first slant surfaces 120 formed along inner peripheral surfaces of the connectors 100a and 100b in such a manner as to become narrow from the front end peripheries thereof to the rear end peripheries thereof, first projections 110 formed along the smallest inner peripheral surfaces in the inner peripheral surfaces of the connectors 100a and 100b in such a manner as to protrude vertically toward a direction where an imaginary line L traverses centers of the connectors 100a and 100b, a coated surface 130 formed on an area where the lower end inner peripheries of the connectors 100a and 100b and the first projections 110 are located in such a manner as to be vertically stepped toward the direction where the imaginary line L is formed, and first screw threads 140 formed along outer peripheral surfaces of areas where the connectors 100a and 100b are located; first pads 200 having second slant surfaces 210 whose inner and outer peripheries become enlarged from front ends thereof toward rear ends thereof in such a manner as to be inserted into the front end peripheries of the connectors 100a and 100b, second projections 211 protruding from the front inner peripheral surfaces of the second slant surfaces 210 toward the direction where the imaginary line L is located in such a manner as to allow the front end peripheries of the second slant surfaces 210 to come into contact with the coated surface 130, and mounting surfaces 220 protruding from the outer peripheral surfaces of the rear ends of the second slant surfaces 210 in outer circumferential directions thereof in such a manner as to become enlarged from the inner peripheries of the front ends thereof toward the inner peripheries of the rear ends thereof to be thus mounted on the rear end peripheries of the connectors 100*a* and 100*b*; sealing washers 300 having third slant surfaces 310 whose inner and outer peripheries become enlarged from front ends thereof toward rear ends thereof in such a manner as to be inserted into the inner peripheral surfaces of the mounting surfaces 220 and vertical stepped surfaces 320 protruding vertically from the outer peripheral surfaces of the rear ends of the third slant surfaces 310 in outer circumferential directions thereof; tie rings 400 having fourth slant surfaces 410 whose front ends have outer peripheries corresponding to the inner peripheries of the vertical stepped surfaces 320 and whose inner peripheries become enlarged toward the rear ends thereof in such a manner as to be thus seated onto the inner peripheral surfaces of the vertical stepped surfaces 320 and through holes 400*a* for dimension compatibility formed on one side thereof in circumferential directions thereof in such a manner as to be traversed from the front end thereof toward the rear end thereof; second pads 500 having fifth slant surfaces 510 whose front end peripheries correspond to the rear end peripheries of the vertical stepped surfaces 320 in such a manner as to come into contact with the rear end peripheries of the vertical stepped surfaces 320 and whose outer peripheries become enlarged from the front ends thereof toward the rear ends thereof, rounded stepped surfaces 520 formed concavely on the inner peripheries of the front ends thereof in such a manner as to fit the rear end peripheries of the tie rings 400 thereto, locking portions 521 protruding from one side of the rounded stepped surfaces 520 in such a manner as to be inserted into the through holes 400*a* for dimension compatibility of the tie rings 400, and openings 500*a* for dimension compatibility formed on one side of the peripheral surfaces thereof in such a manner as to be traversed from the front ends thereof toward the rear ends thereof; and nuts 600 having second screw threads 610 formed on the inner peripheries of the front end portions thereof in such a manner as to be coupled to the first screw threads 140 and sixth slant surfaces 620 formed on the inner peripheries of the rear end portions thereof in such a manner as to be reduced from the front ends thereof toward the rear ends thereof and to thus insert the second pads 500 thereinto, wherein the coated surface 130 is made of an insulating material and has protrusions 131 protruding slantly downward from inner peripheral surfaces of end peripheries thereof toward directions where the rear end peripheries of the connectors 100*a* and 100*b* are located, and the first pads 200, the sealing washers 300, and the second pads 500 are made of elastic insulating materials, the inner peripheries of the front ends of the sealing washers 300 being smaller than outer diameters of the pipes 10 and the inner peripheries of the rear ends thereof being larger than the outer diameters of the pipes 10.

Particularly, the coated surface 130 is made of an insulating material, and the first pads 200, the sealing washers 300, and the second pads 500 are made of elastic insulating materials.

Further, the inner peripheries of the front ends of the sealing washers 300 are smaller than outer diameters of the pipes 10, and the inner peripheries of the rear ends thereof are larger than the outer diameters of the pipes 10.

Furthermore, the tie rings 400 are made of a material made by compressing and molding powder of a metal or metal oxide and by then sintering the molded material under a melting temperature.

Also, each tie ring 400 has tetrahedron-shaped guides 411 equally spaced apart from each other in such a manner as to protrude from the inner periphery thereof.

In addition, the openings 500*a* for dimension compatibility of the second pads 500 are formed on one side of the peripheral surfaces of the second pads 500 in such a manner as to be traversed from the front ends toward the rear ends thereof, and otherwise, they are formed open only from the front ends of the second pads 500 to the rear end portions thereof excepting the rear ends thereof.

Further, the second pads 500 have the locking portions 521 protruding inward from one side of the rounded stepped surfaces 520 thereof in such a manner as to be inserted into the through holes 400*a* for dimension compatibility of the tie rings 400, and the locking portions 521 are extended to the front end directions of the second pads 500.

Advantageous Effects

According to the present invention, the fluid flowing along the pipes does not come into direct contact with the pipes made of the metal materials, the body, and the tie rings, thereby preventing their corrosion, and even if the pipes made of different kinds of materials are connected, the pipes are not indirectly connected at all by means of the fluid flowing along the insides thereof, thereby preventing electric corrosion caused by the micro current contained in the fluid (thereby providing excellent water tightness and high corrosion resistance).

According to the present invention, in addition, the through holes for dimension compatibility of the tie rings and the openings for dimension compatibility of the second pads absorb the dimensional tolerances between the pipes having different sizes, together with the slant or tapered surfaces of the respective parts of the pipe coupler, thereby ensuring simple installation (thereby providing excellent compatibility and constructability.

According to the present invention, further, when the pipes are coupled to the nuts, the guides of the tie rings serve to hold the outer peripheral surfaces of the pipes, thereby providing a high tension resistance, and also, the second pads are made of a composite material which is made by impregnating glass fiber having excellent corrosion resistance and insulating properties into nylon plastic having self-lubricity, a relatively low coefficient of friction, and excellent abrasion resistance, so that they absorb external impacts in a state of being coupled to the nuts, thereby preventing the nuts from loosening and protecting the pipes from damages (thereby ensuring a structure having high durability and vibration resistance).

EXPLANATIONS ON REFERENCE NUMERALS

Figure 1:
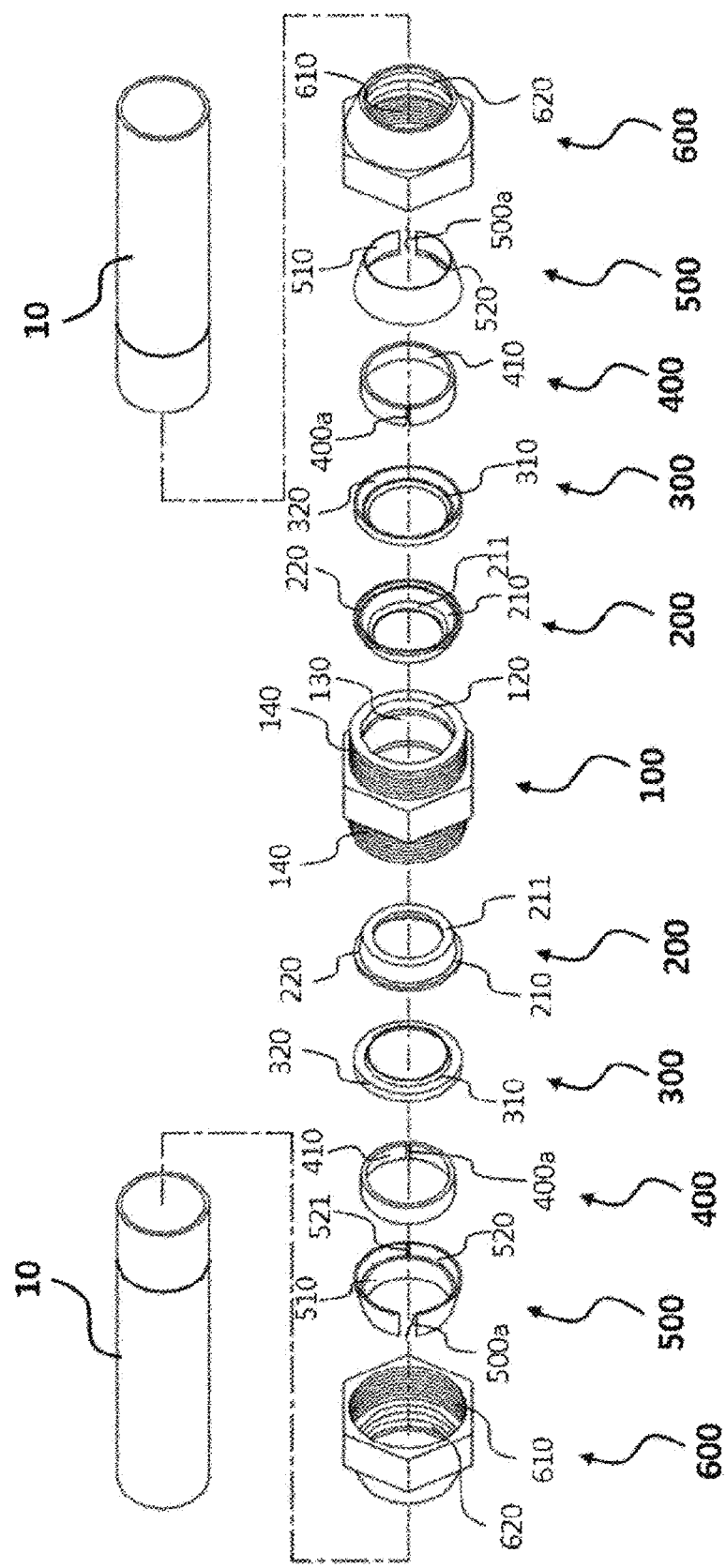
FIG. 1 is an exploded perspective view showing a pipe coupler according to the present invention.

10: pipe
L: imaginary line
100: body 100a, 100b, 100c: connector
110: first stepped projection 120: first slant surface
130: coated surface 131: protrusion
140: first screw thread
200: first pad 210: second slant surface
211: second stepped projection 220: mounting surface
300: sealing washer 310: third slant surface
320: vertical stepped surface 400: tie ring
400a: through hole for dimension compatibility
410: fourth slant surface
411: guide
500: second pad
500a: opening for dimension compatibility
510: fifth slant surface 520: rounded stepped surface
521: locking portion
600: nut 610: second screw thread
620: sixth slant surface 621: root

BEST MODE FOR INVENTION

Hereinafter, the present invention will now be described in detail with reference to the attached drawings. Before the present invention is disclosed and described, it is to be understood that the disclosed embodiments are provided to generally understand methods, devices and/or systems as will be described below. However, the disclosed embodiments are merely exemplary of the invention, and the present invention is not limited thereto. The corresponding parts in the drawings are indicated by corresponding reference numerals.

FIG. 1 is an exploded perspective view showing a pipe coupler according to the present invention.

As shown in FIG. 1, the present invention relates to a pipe coupler that is capable of preventing, even if pipes made of different kinds of materials are connected to each other, contact corrosion from occurring due to an electric potential difference between the pipes and absorbing a dimensional tolerance between pipes having different sizes to achieve simple installation, and the pipe coupler according to the present invention includes: a body 100 having connectors 100a and 100b corresponding to at least two or more pipes 10 inserted thereinto in such a manner as to allow the pipes 10 to be connected thereto; first pads 200 insertedly mounted into the connectors 100a and 100b, respectively; sealing washers 300 inserted into the inner peripheral surfaces of the first pads 200, respectively; tie rings 400 insertedly seated on the first pads 200, respectively; second pads 500 surroundingly fitting the tie rings 400 thereto, respectively; and nuts 600 insertedly passing through the second pads 500, the tie rings 400, and the sealing washers 300, sequentially in such a manner as to be fitted to the pipes 10 seated onto the rear end peripheries of the first pads 200, respectively, and to be thus coupled to the body 100.

The pipes 10, which are used with general pipes in the conventional practices, have internal paths through which a fluid passes, and there are galvanized steel pipes, stainless steel SCH pipes, stainless SU pipes, and copper pipes having different outer diameters according to their standardized sizes.

In this case, the outer diameters of the pipes 10 have tolerances in the range of about 0.5 to 1.42 mm, as shown in Table 1.

TABLE 1

| Galvanized steel pipe, Stainless steel SCH pipe | | Stainless SU pipe | | Copper pipe | | Outer |
|---|---|---|---|---|---|---|
| No. | Outer diameter (mm) | No. | Outer diameter (mm) | No. | Outer diameter (mm) | diameter difference (mm) |
| 15 | 21.7 | 20 | 22.22 | 20 | 22.22 | 0.52 |
| 20 | 27.2 | 25 | 28.58 | 25 | 28.58 | 1.36 |
| 25 | 34.0 | 30 | 34.0 | 32 | 34.92 | 0.92 |
| 32 | 42.7 | 40 | 42.7 | 40 | 41.28 | 1.42 |

Desirably, the pipes 10 have the front outer peripheries reduced slantly toward the front ends thereof in such a manner as to be easily insertedly fitted to a structure having a given inner diameter on a front end periphery thereof.

Even in case where the pipe coupler according to the present invention connects the pipes 10 made of different kinds of materials to each other, especially, it prevents the pipes 10 made of the different kinds of materials from each other from being corroded due to an electric potential difference because a fluid flowing along the internal paths of the pipes 10 serves as an electrolyte, and even if there is a difference between the outer diameters of the pipes 10 connected to each other, of course, the pipe coupler according to the present invention can be installed, while absorbing the dimensional tolerance between the pipes 10.

Figure 2:
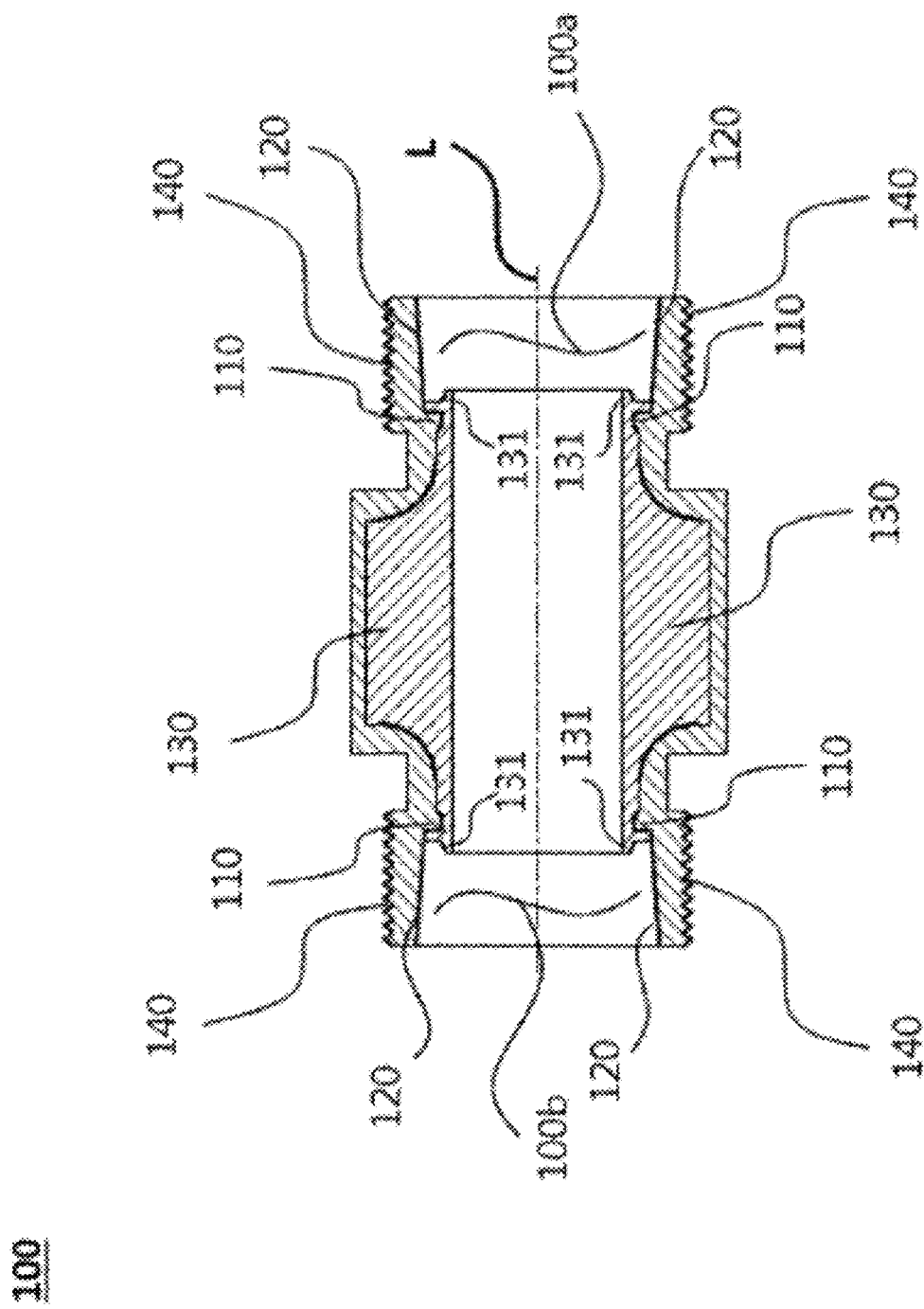
FIG. 2 is a sectional view showing a first example of a body of the pipe coupler according to the present invention.
Figure 3:
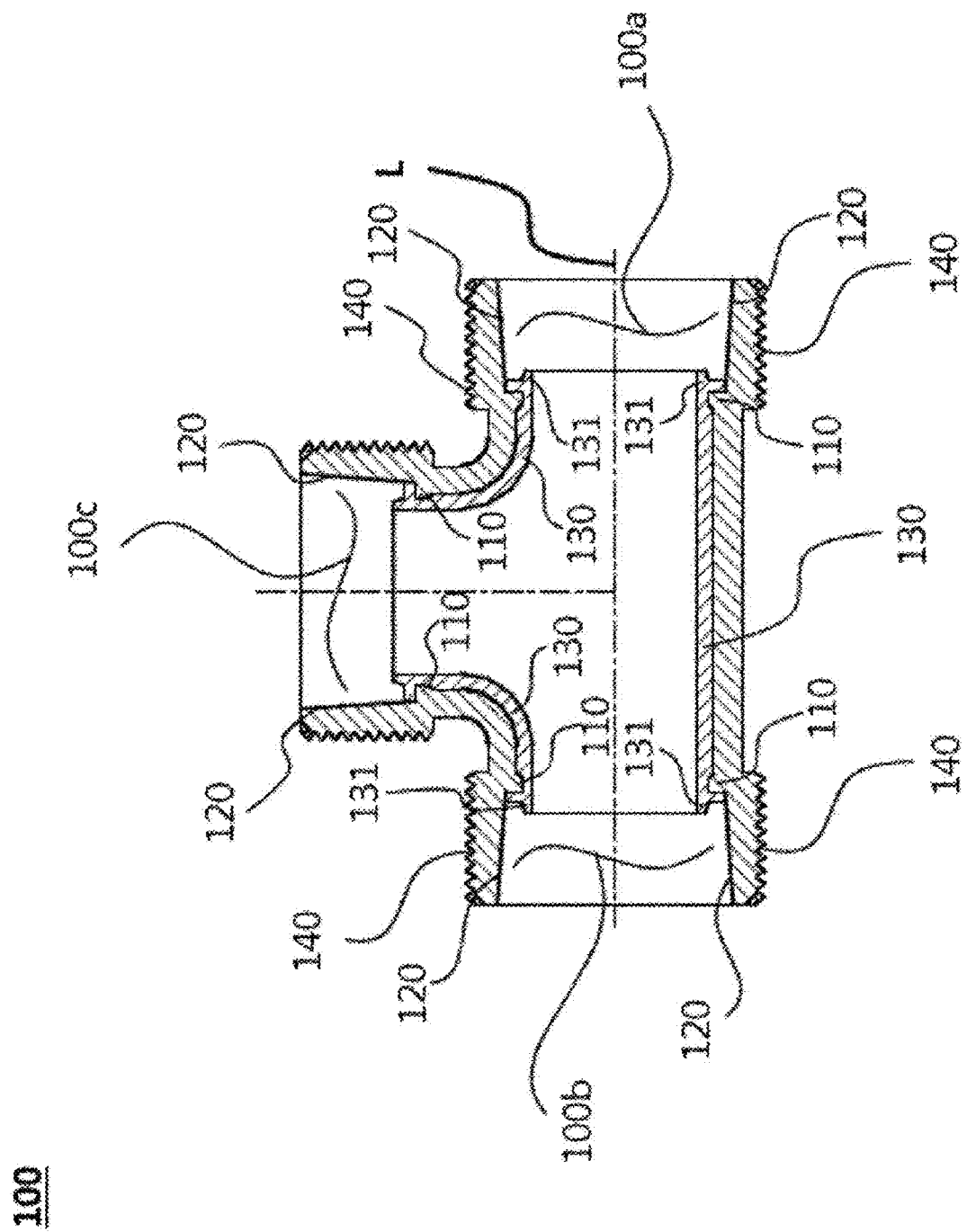
FIG. 3 is a sectional view showing a second example of the body of the pipe coupler according to the present invention.
Figure 4:
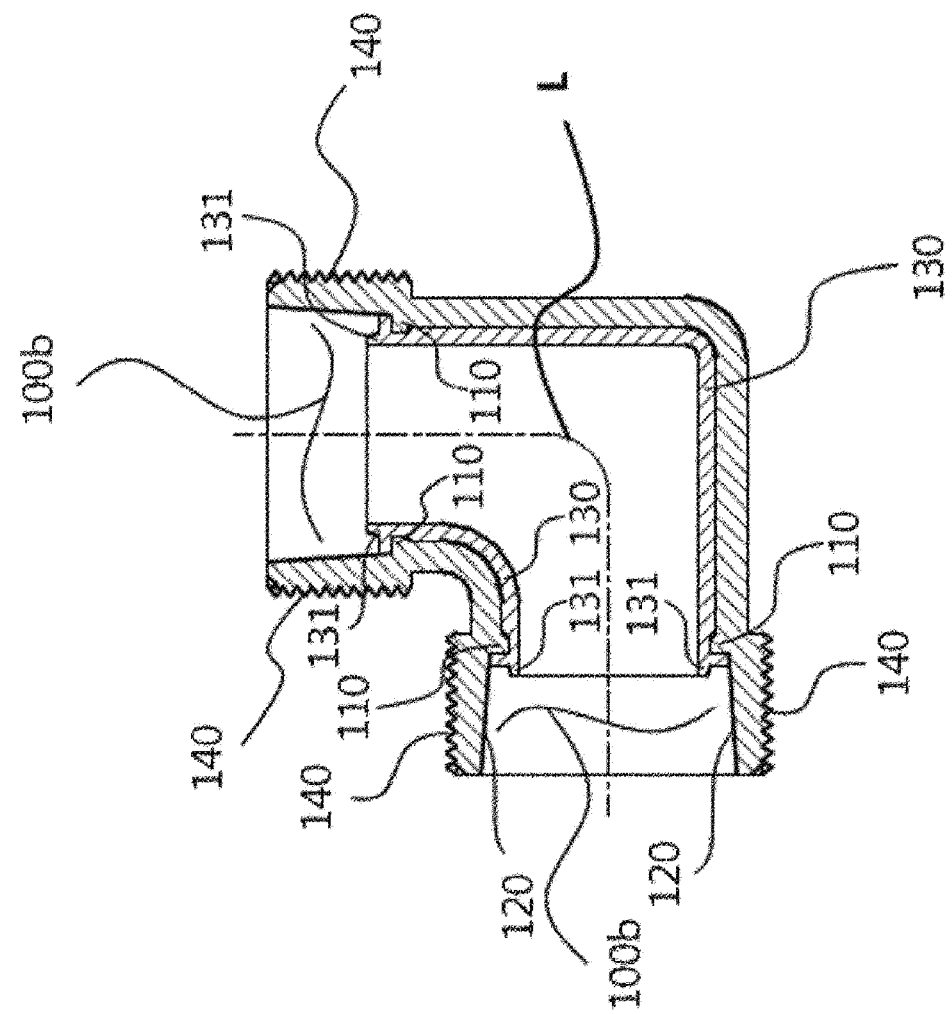
FIG. 4 is a sectional view showing a third example of the body of the pipe coupler according to the present invention.

FIG. 2 is a sectional view showing a first example of a body of the pipe coupler according to the present invention, FIG. 3 is a sectional view showing a second example of the body of the pipe coupler according to the present invention, and FIG. 4 is a sectional view showing a third example of the body of the pipe coupler according to the present invention.

As shown in FIGS. 1 to 4, the body 100 is a joint for allowing at least two or more pipes 10 to communicate with each other, and according to the first example of the present invention, it has roughly the shape of '-' when viewed on the side thereof. According to the second example of the present invention, further, the body 100 has roughly the shape of 'T' when viewed on the side thereof, and according to the third example of the present invention, furthermore, it has roughly the shape of '⏋' when viewed on the side thereof.

The body 100 has the connectors 100a, 100b, and 100c formed on end portions thereof in such a manner as to be connected to the pipes 20, and in this case, the connectors 100a, 100b, and 100c communicate with one another.

Particularly, the body 100 has first slant surfaces 120 formed along inner peripheral surfaces of the connectors 100a and 100b in such a manner as to become narrow from the front end peripheries thereof to the rear end peripheries thereof, first projections 110 formed along the smallest inner peripheral surfaces in the inner peripheral surfaces of the connectors 100a and 100b in such a manner as to protrude vertically toward a direction where an imaginary line L traversing centers of the connectors 100a and 100b, a coated surface 130 formed on an area where the lower end inner peripheries of the connectors 100a and 100b and the first projections 110 are located in such a manner as to be vertically stepped toward the direction where the imaginary line L is formed, and first screw threads 140 formed along outer peripheral surfaces of areas where the connectors 100a and 100b are located.

When the first pads 200 are inserted into the front end peripheries of the connectors 100a and 100b, respectively, the coated surface 130 is made of an elastic insulating material so as to fix the first pads 200 in position and also to prevent the first pads 200 from coming into direct contact with the fluid flowing along the pipes 10 to thus avoid internal corrosion. Further, the body 100 has protrusions 131 protruding slantly downward from inner peripheral surfaces of both ends of the coated surface 130 toward directions where the rear end peripheries of the connectors 100a and 100b are located.

According to the present invention, the coated surface 130 is made of a polyethylene material having excellent impact resistance and easiness in machining.

So as to enhance corrosion resistance and toughness, further, Geomet coating using spheroidal graphite cast iron is desirably applied to the outer peripheral surface of the body 100.

Figure 5:
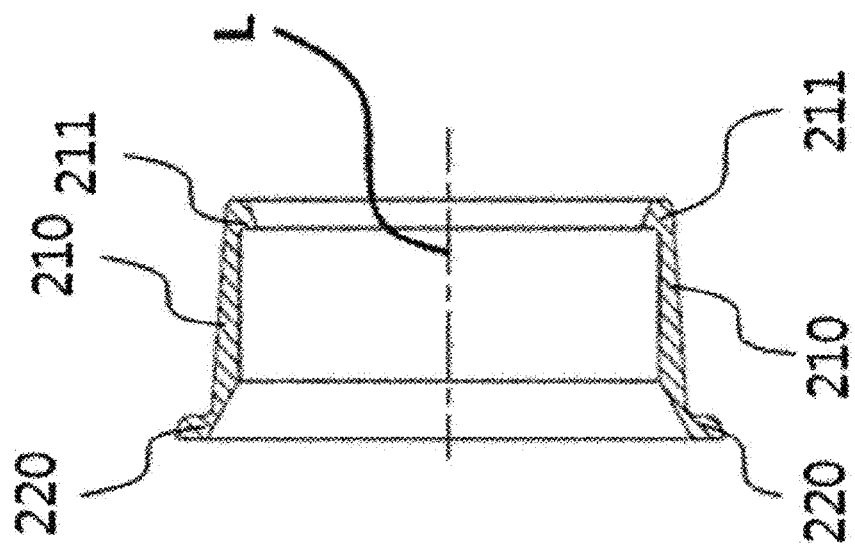
FIG. 5 is a sectional view showing a first pad of the pipe coupler according to the present invention.

FIG. 5 is a sectional view showing a first pad of the pipe coupler according to the present invention. As shown in FIGS. 1 and 5, each first pad 200 serves as means for fixing and sealing the pipe 10 connected and includes a second slant surface 210 whose inner and outer peripheries become enlarged from front ends thereof toward rear ends thereof in such a manner as to be inserted into the front end periphery of the corresponding connector 100a or 100b, a second projection 211 protruding from the front inner peripheral surface of the second slant surface 210 toward the direction where the imaginary line L is located in such a manner as to allow the front end periphery of the second slant surface 210 to come into contact with the coated surface 130, and a mounting surface 220 protruding from the outer peripheral surface of the rear end of the second slant surface 210 in an outer circumferential direction thereof in such a manner as to become enlarged from the inner periphery of the front end thereof toward the inner periphery of the rear end thereof to be thus mounted on the rear end peripheral surface of the corresponding connector 100a or 100b.

Particularly, the second projections 211 have the inner peripheries slant upward in the front end peripheral directions of the connectors 100a and 100b in such a manner as to come into contact with the protrusions 131 protruding from the inner peripheral surfaces of both ends of the coated surface 130, and in a process where the pipes 10 are inserted into the first pads 200 and the connectors 100a and 100b, accordingly, the first pads 200 to which pressures are applied are deformed to shapes that fill areas between the connectors 100a and 100b and the pipes 20 to seal clearances therebetween.

Further, the first pads 200 are made of elastic insulating materials so that since they surround the interiors of the connectors 100a and 100b of the body 100, together with the coated surface 130, they can be prevented from coming into direct contact with the fluid flowing along the pipes 10 and even if the pipes 10 made of different kinds of materials are connected, they can protect the pipes 10 from contact corrosion and can seal the pipes 10 connected.

According to the present invention, the first pads 200 are made of polyurethane materials having excellent elasticity, mechanical properties, mineral oil resistance, aging resistance, and weather resistance.

Figure 6:
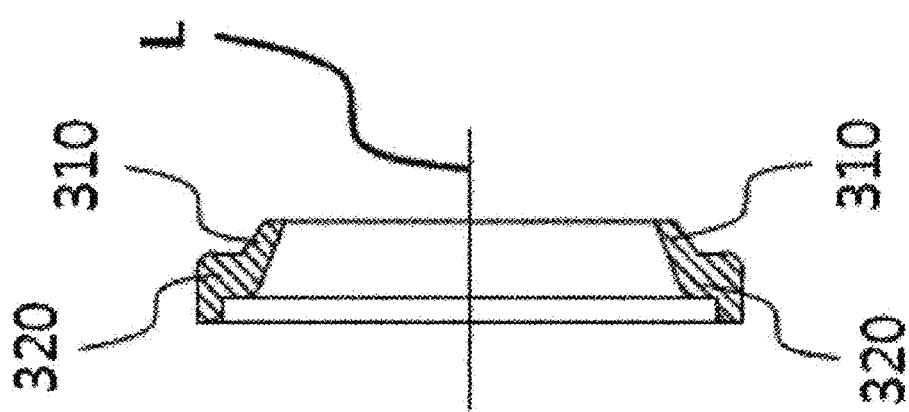
FIG. 6 is a sectional view showing a sealing washer of the pipe coupler according to the present invention.

FIG. 6 is a sectional view showing a sealing washer of the pipe coupler according to the present invention. As shown in FIGS. 1 and 6, each sealing washer 300 serves as means that is connected to the corresponding tie ring 400 to seal the pipe 10 connected, together with the first pad 10 and includes a third slant surface 310 whose inner and outer peripheries become enlarged from front ends thereof toward rear ends thereof in such a manner as to be inserted into the inner peripheral surface of the mounting surface 220 and a vertical stepped surface 320 protruding vertically from the outer peripheral surface of the rear end of the third slant surface 310 in an outer circumferential direction thereof.

Further, the sealing washers 300 are made of elastic insulating materials so that since they surround the outer peripheral surfaces of the front ends of the pipes 10 in such a manner as to be connected to the first pads 200 to seal the pipes 10, they can be prevented from coming into contact with the fluid flowing along the pipes 10 and even if the pipes 10 made of different kinds of materials are connected to the pipe coupler, they can protect the pipes 10 from contact corrosion.

According to the present invention, the sealing washers 300 are made of ethylene-propylene rubber having high elasticity, ozone resistance, and weather resistance.

Especially, the inner peripheries of the front ends of the sealing washers 300 are smaller than outer diameters of the pipes 10, so that the sealing washers 300 can be press-fitted to the front end peripheries of the pipes 10, and the inner peripheries of the rear ends of the sealing washers 300 are larger than the outer diameters of the pipes 10, so that the sealing washers 300 can be located at positions coming into contact with the tie rings 400 surrounding the outer peripheral surfaces of the front ends of the pipes 10.

Figure 7:
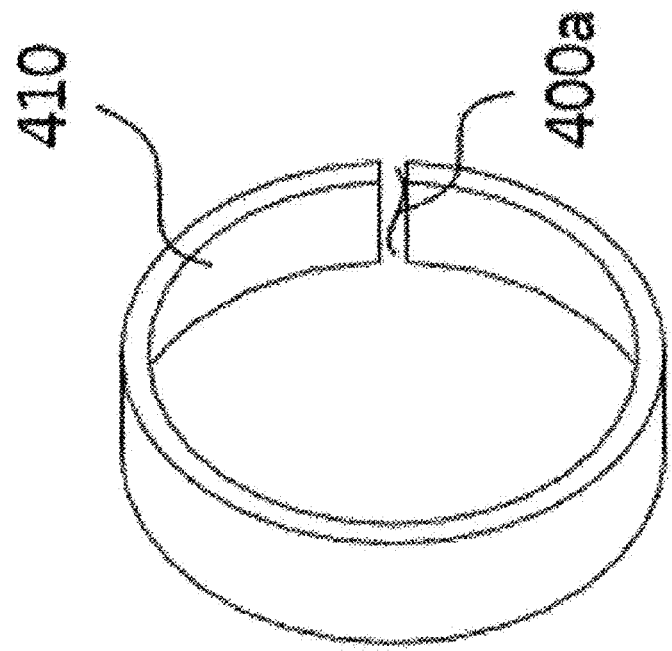
FIG. 7 is a perspective view showing a first example of a tie ring of the pipe coupler according to the present invention.
Figure 8:
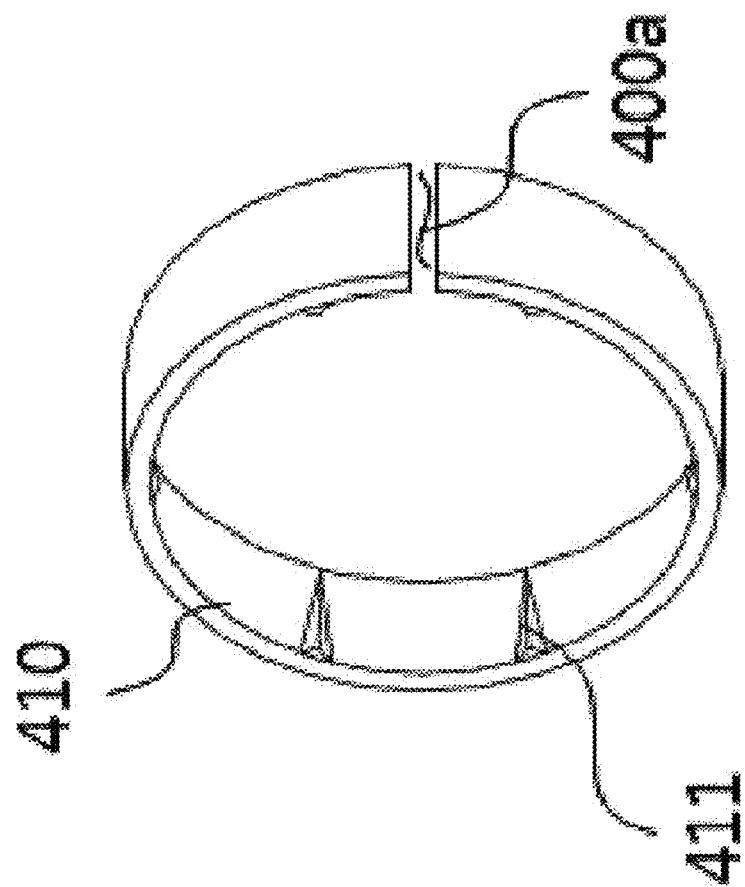
FIG. 8 is a perspective view showing a second example of the tie ring of the pipe coupler according to the present invention.

FIG. 7 is a perspective view showing a first example of a tie ring of the pipe coupler according to the present invention, and FIG. 8 is a perspective view showing a second example of the tie ring of the pipe coupler according to the present invention.

As shown in FIGS. 1 and 7, each tie ring 400 has excellent tensile stress and thus serves to absorb stress generated when the pipe 10 is coupled to the nut 600. The tie ring 400 includes a fourth slant surface 410 whose front end has an outer periphery corresponding to the inner periphery of the vertical stepped surface 320 and whose inner periphery become enlarged toward the rear end thereof in such a manner as to be thus seated onto the inner peripheral surface of the vertical stepped surface 320 and a through hole 400a for dimension compatibility formed on one side thereof in a circumferential direction in such a manner as to be traversed from the front end thereof toward the rear end thereof.

Especially, the fourth slant surface 410 of the tie ring 400 serves to allow the front end periphery of the pipe 10 to easily insertedly pass therethrough, and the through hole 400a for dimension compatibility is formed compatible according to the outer diameter of the pipe 10. In detail, even if the inner periphery of the tie ring 400 is smaller than the outer periphery of the pipe 10, the through hole 400a for dimension compatibility serves to easily enlarge the inner periphery of the tie ring 400 so that the front end periphery of the pipe 10 can be forcedly inserted into the fourth slant surface 410 of the tie ring 400.

So as to allow the tie ring 400 to cope with the tensile stress received in a direction to which the tensile stress is applied and to allow the inner periphery thereof to be easily enlarged if stress of the pipe 10 is transferred from the inner periphery thereof to the outer periphery thereof, the tie ring 400 is made of a material that is made by compressing and molding powder of an iron-carbon-copper material or metal oxide having excellent abrasion resistance and good as a material for a structural part and by then sintering the molded material under a melting temperature. According to the present invention, desirably, the tie ring 400 is made of an SMF4020 material.

On the other hand, as shown in FIG. 8, the tie ring 400 has tetrahedron-shaped guides 411 equally spaced apart from each other in such a manner as to protrude from the inner peripheral surface thereof to thus hold the outer periphery of the pipe 10, so that when the pipe 10 is coupled to the nut 600, the guides 411 receive a force from the second pad 500 to rigidly fix the outer periphery of the pipe 10 thereto. In this case, desirably, two peaks of the four peaks of each tetrahedron guide 411 come into contact with the rear end of the inner periphery of the tie ring 400, and one peak thereof come into contact with the front end of the inner periphery of the tie ring 400.

Figure 9:
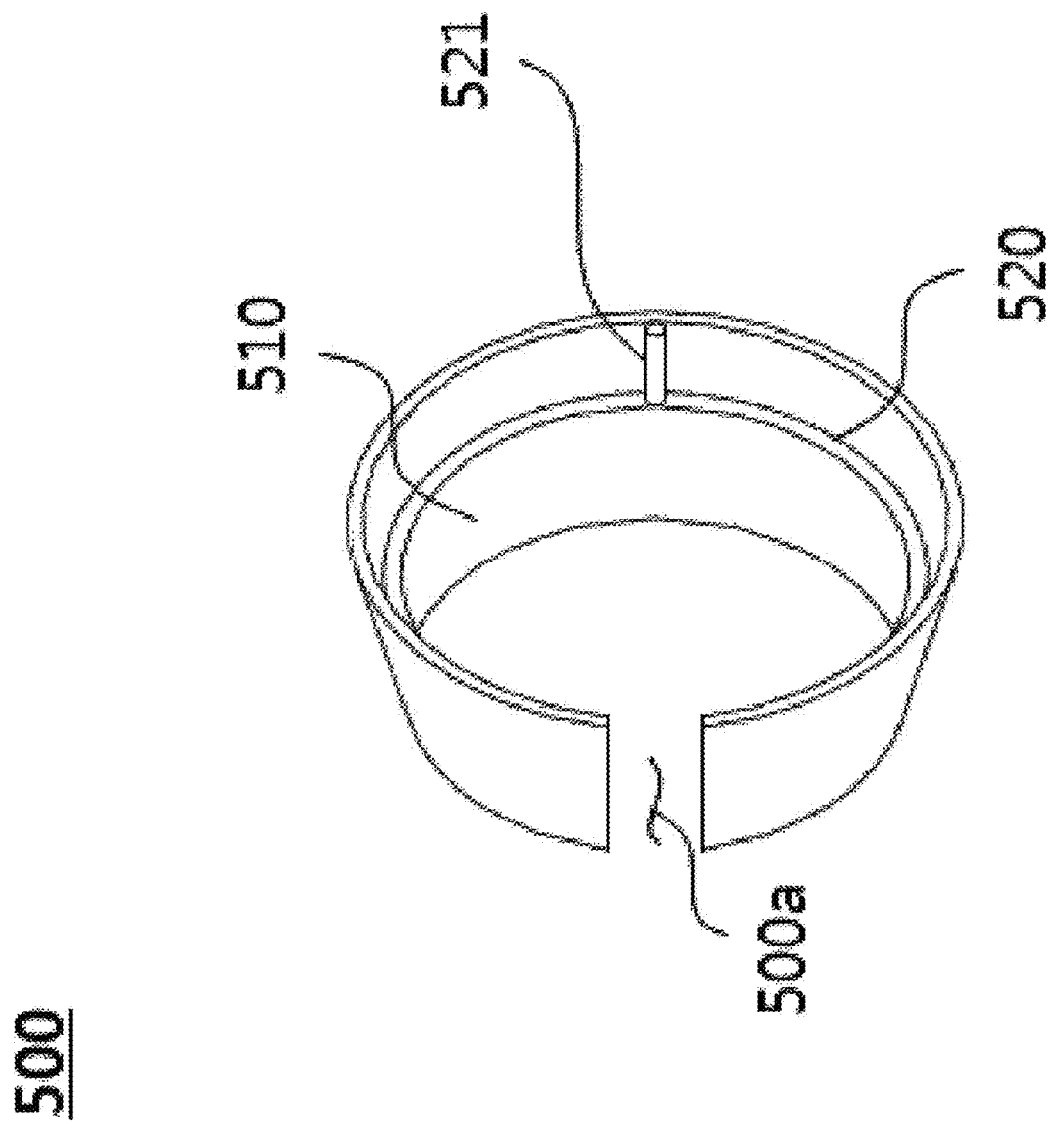
FIG. 9 is a perspective view showing a first example of a second pad of the pipe coupler according to the present invention.
Figure 10:
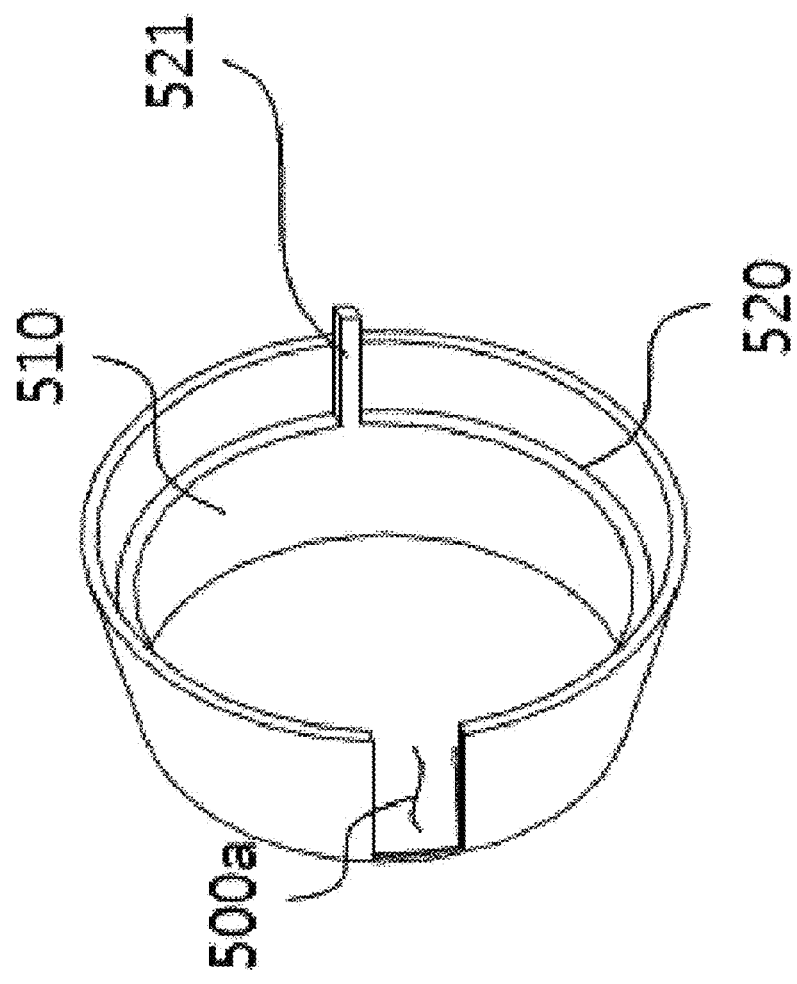
FIG. 10 is a perspective view showing a second example of the second pad of the pipe coupler according to the present invention.

FIG. 9 is a perspective view showing a first example of a second pad of the pipe coupler according to the present invention, and FIG. 10 is a perspective view showing a second example of the second pad of the pipe coupler according to the present invention.

As shown in FIGS. 1, 9 and 10, the second pad 500 serves to distribute the stress received when the nut 600 is coupled to the body 100 with respect to the tie ring 400 fitted to the pipe 10, together with the tie ring 400, and to thus guide the pipe 10 to a given position. The second pad 500 includes a fifth slant surface 510 whose front end periphery corresponds to the rear end periphery of the vertical stepped surface 320 in such a manner as to come into contact with the rear end periphery of the vertical stepped surface 320 and whose outer periphery becomes enlarged from the front end thereof toward the rear end thereof, a rounded stepped surface 520 formed concavely on the inner periphery of the front end thereof in such a manner as to fit the rear end periphery of the tie ring 400 thereto, a locking portion 521 protruding from one side of the rounded stepped surface 520 in such a manner as to be inserted into the through hole 400a for dimension compatibility of the tie ring 400, and an opening 500a for dimension compatibility formed on one side of the peripheral surface thereof in such a manner as to be traversed from the front end toward the rear end thereof.

As the locking portion 521 of the second pad 500 is inserted into the through hole 400a for dimension compatibility of the tie ring 400, especially, the second pad 500 can be prevented from idling in a circumferential direction in a process where the nut 600 is coupled to the body 100, and also, the second pad 500 can guide the pipe 10 to the given position. Even if the opening 500a for dimension compatibility has the inner periphery smaller than the outer periphery of the pipe 10, in the same manner as the through hole 400a for dimension compatibility of the tie ring 400, it serves to easily enlarge the inner periphery of the second pad 500 so that the front end periphery of the pipe 10 can be forcedly inserted into the fifth slant surface 510 of the second pad 500.

On the other hand, the opening 500a for dimension compatibility of the second pad 500 is formed on one side of the peripheral surface of the second pad 500 in such a manner as to be traversed from the front end toward the rear end thereof (See FIG. 9), and otherwise, it may be formed open only from the front end of the second pad 500 to the rear end portion thereof excepting the rear end thereof (See FIG. 10).

If the opening 500a for dimension compatibility of the second pad 500 is formed open only from the front end of the second pad 500 to the rear end portion thereof excepting the rear end thereof (See FIG. 10), one side rear end of the periphery of the second pad 500 is bent and coupled to the pipe 10 during the compression of the pipe 10 thereagainst, while being coupled to the pipe 10, thereby preventing the surrounding parts thereof from escaping from the second pad 500.

Further, the locking portion 521 protrudes inward from one side of the rounded stepped surface 520 of the second pad 500 in such a manner as to be inserted into the through hole 400a for dimension compatibility of the tie ring 400, and in this case, the locking portion 521 is extended to the front end direction of the second pad 500 to thus serve as a guide for holding centering positions of the surrounding parts thereof.

Furthermore, the second pads 500 are made of elastic insulating materials so that they perform sealing functions, in the same manner as the first pads 200 and the sealing washers 300 to be thus prevented from coming into direct contact with the fluid and even if the pipes 10 made of different kinds of materials are connected to the pipe coupler, they can protect the pipes 10 from contact corrosion.

According to the present invention, the second pads 200 are made of a composite material which is made by impregnating glass fiber having excellent corrosion resistance and insulating properties into nylon plastic having self-lubricity, a relatively low coefficient of friction, and excellent abrasion resistance.

Figure 11:
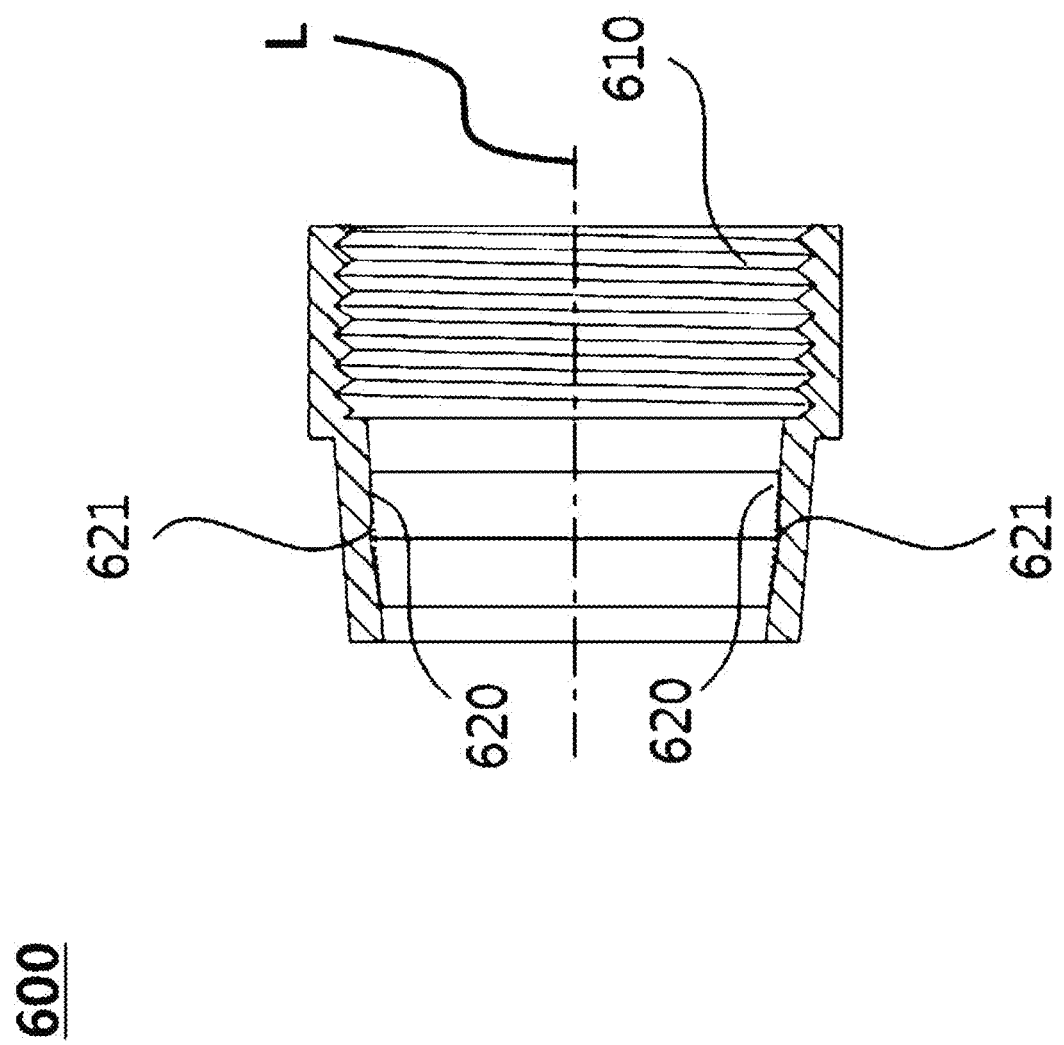
FIG. 11 is a sectional view showing a nut of the pipe coupler according to the present invention.

FIG. 11 is a sectional view showing a nut of the pipe coupler according to the present invention.

As shown in FIGS. 1 and 11, the nut 600 includes a second screw thread 610 formed on the inner periphery of the front end portion thereof in such a manner as to be coupled to the first screw thread 140 and a sixth slant surface 620 formed on the inner periphery of the rear end portion thereof in such a manner as to be reduced from the front end thereof toward the rear end thereof and to thus insert the second pad 500 thereinto.

In this case, if the nut 600 has a root 621 formed concavely on the center of the sixth slant surface 620 in a height direction of the sixth slant surface 620, a friction force between the nut 600 and the second pad 500 in a state where the second screw thread 610 of the nut 600 and the first screw thread 140 of the body 100 are coupled to each other is reduced to prevent the nut 600 from loosening in a process where the pipe 10 is connected, and in the process where the second screw thread 610 of the nut 600 and the first screw thread 140 of the body 100 are coupled to each other, a pressure is collectively applied to the front end periphery of the connector 100a or 100b of the body 100 and the rear end periphery of the tie ring 400, thereby increasing their tensile stress.

Especially, the sixth slant surface 620 of the nut 600 has an inclination corresponding to the fifth slant surface 510 of the second pad 500, and if the nut 600 is coupled to the body 100, the rear end periphery of the second pad 500 is desirably exposed to the inner periphery of the nut 600.

So as to enhance corrosion resistance and toughness, in the same manner as the body 100, Geomet coating using spheroidal graphite cast iron is desirably applied to the outer peripheral surface of the nut 600.

Further, the nut 600 desirably has the shape of a polygon like hexagon, octagon, and so on along one side outer periphery thereof so as to be coupled to the body 100 by means of a wrench or spanner.

Under the above-mentioned configuration of the pipe coupler according to the present invention, the fluid flowing along the pipes does not come into direct contact with the pipes made of the metal materials, the body, and the tie rings, thereby preventing their corrosion, and even if the pipes made of different kinds of materials are connected, the pipes are not indirectly connected at all by means of the fluid flowing along the insides thereof, thereby preventing electric corrosion caused by the micro current contained in the fluid.

The through holes 400*a* for dimension compatibility of the tie rings 400 and the openings 500*a* for dimension compatibility of the second pads 500 absorb the dimensional tolerances of the pipes having different sizes, together with the slant or tapered surfaces of the respective parts of the pipe coupler, thereby ensuring simple installation.

Figure 12:
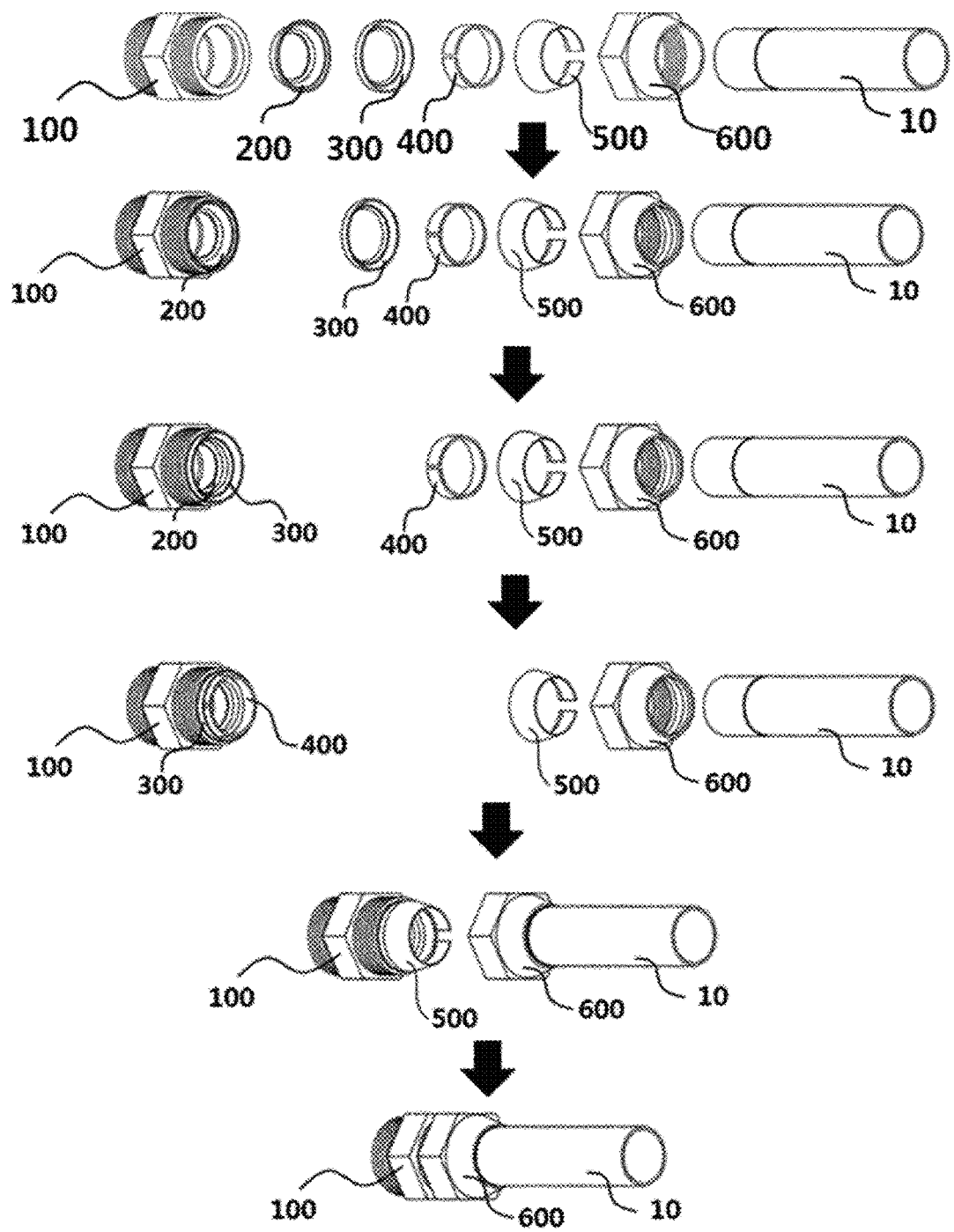
FIG. 12 is a perspective view showing a sequential coupling procedure of the pipe coupler according to the present invention.

FIG. 12 is a perspective view showing a sequential coupling procedure of the pipe coupler according to the present invention. Hereinafter, an explanation on a method for coupling the pipe coupler according to the present invention to the pipes will be given with reference to FIG. 12.

The first pad 200 is inserted into the connector 100*a* of the body 100, and the sealing washer 300 is seated onto the rear end periphery of the first pad 200. Next, the tie ring 400 is seated onto the inner periphery of the vertical stepped surface 320 of the sealing washer 300, and the locking portion 521 of the second pad 500 is inserted into the through hole 400*a* for dimension compatibility of the tie ring 400, while surrounding the tie ring 400. After that, the fifth slant surface 510 of the second pad 500 comes into contact with the sixth slant surface 620 of the nut 600.

On the other hand, burrs are removed from the front end periphery of the pipe 10, and a line is marked on a boundary line of the pipe 10 to which the pipe coupler is connected.

The front end periphery of the pipe 10 is inserted into the nut 600, the second pad 500, the tie ring 400, and the sealing washer 300, and in this case, the inserted front end periphery of the pipe 10 is pushed and located on the first slant surface 120 of the body 100. Next, the nut 600 rotates by means of the wrench or spanner and is thus coupled to the body 100 in such a manner as to allow the marked line to be located on the rear end periphery of the nut 600.

The other side pipe 10 can be coupled to the connector 100*b* of the body 100 of the pipe coupler according to the present invention in the same manner as the above-mentioned coupling method, thereby completing coupling between the pipe coupler and the pipes. According to the second and third examples of the body, of course, the above-mentioned coupling method may be carried out by the number of times corresponding to the number of connectors 100*a*, 100*b*, and 100*c* of the body 100, thereby completing coupling between the pipe coupler and the pipes.

INDUSTRIAL APPLICABILITY

According to the present invention, the fluid flowing along the pipes does not come into direct contact with the pipes made of the metal materials, the body, and the tie rings, thereby preventing their corrosion, and even if the pipes made of different kinds of materials are connected, the pipes are not indirectly connected at all by means of the fluid flowing along the insides thereof, thereby preventing electric corrosion caused by the micro current contained in the fluid (thereby providing excellent water tightness and high corrosion resistance).

According to the present invention, in addition, the through holes for dimension compatibility of the tie rings and the openings for dimension compatibility of the second pads absorb the dimensional tolerances between the pipes having different sizes, together with the slant or tapered surfaces of the respective parts of the pipe coupler, thereby ensuring simple installation (thereby providing excellent compatibility and constructability.

According to the present invention, further, when the pipes are coupled to the nuts, the guides of the tie rings serve to hold the outer peripheral surfaces of the pipes, thereby providing a high tension resistance, and also, the second pads are made of a composite material which is made by impregnating glass fiber having excellent corrosion resistance and insulating properties into nylon plastic having self-lubricity, a relatively low coefficient of friction, and excellent abrasion resistance, so that they absorb external impacts in a state of being coupled to the nuts, thereby preventing the nuts from loosening and protecting the pipes from damages (thereby ensuring a structure having high durability and vibration resistance).

As described above, the pipe coupler according to the present invention has excellent water tightness, corrosion resistance, and durability, and high dimension compatibility and constructability, and a vibration resistant structure, so that it can be widely used in various industrial fields.

The invention claimed is:

1. A pipe coupler comprising:
   a body having:
      a connector corresponding to a pipe inserted thereinto in such a manner as to allow the pipe be connected thereto,
      a first slant wall formed along an inner peripheral surface of the connector in such a manner as to become narrower from an exterior end to an interior end of the first slant wall,
      a first projection formed along a narrowest circumferential portion of the inner peripheral surface of the connector in such a manner as to protrude radially with respect to an imaginary line (L) defining a longitudinal axis of the connector, and
      a coated surface formed on an area where an interior end of the connector and the first projection are located such that the first projection is radially stepped with respect to the imaginary line (L), and a first screw thread formed along an outer peripheral surface near an exterior end of the connector;
   a first pad having:
      a second slant wall including inner and outer peripheral surfaces configured to become narrower from an exterior end toward an interior end of the second slant wall in such a manner as to be inserted into the exterior end of the connector,
      a second projection protruding from the inner peripheral surface of the second slant wall at an interior end toward the imaginary line (L) in such a manner as to allow the interior end of the second slant wall to come into contact with the coated surface, and
      a mounting surface protruding from an outer peripheral surface of the exterior end of the second slant wall in radial directions of the imaginary line (L) to be mounted on the exterior end of the connector such that an inner peripheral surface near the exterior end of the connector becomes narrower toward the interior end of the connector;

a sealing washer including a third slant wall including inner and outer peripheral surfaces configured to become narrower from an exterior end toward an interior end of the sealing washer in such a manner as to be inserted into the inner peripheral surface of the mounting surface, a transversely stepped wall protruding radially with respect to the imaginary line (L) from the outer peripheral surface of the exterior end of the third slant wall in radial directions of the imaginary line (L);

a tie ring including a fourth slant wall including an interior end having an outer peripheral surface corresponding to an inner peripheral surface of the transversely stepped wall, an inner peripheral surface of the fourth slant wall becoming narrower toward the interior end of the tie ring, the tie ring further including through a hole for dimensional compatibility which is formed on one side of the tie ring in a longitudinal direction of the pipe coupler in such a manner as to extend from an exterior end toward the interior end of the tie ring;

a second pad including a fifth slant wall including an interior end corresponding dimensionally to an exterior end of the transversely stepped wall in such a manner as to come into contact with the exterior end of the transversely stepped wall, an outer peripheral surface of the fifth slant wall becoming narrower from the interior end toward an exterior end of the second pad, the second pad further including a rounded stepped surface formed concavely on an inner peripheral surface of the interior end of the second pad in such a manner as to fit with the exterior end of the tie ring thereto, the second pad further including a locking portion protruding from one side of the rounded stepped surface in such a manner as to be inserted into a through hole for dimensional compatibility of the tie ring, and the second pad further including an opening for dimensional compatibility formed on one side of the second pad in such a manner as to be traversed in a longitudinal direction of the pipe coupler from the interior end toward the exterior end of the second pad; and a nut having a second screw thread formed on an inner peripheral surface of an interior end portion of the nut in such a manner as to be coupled to the first screw thread, and a sixth slant wall formed on an inner peripheral surface of an end portions of the nut in such a manner as to become narrower from an interior end toward an exterior end of the nut and to thus insert the second pad thereinto, wherein the coated surface is made of an insulating material and has a protrusion at the exterior end of the connector with an outer peripheral surface slanted downward toward the interior end of the connector, wherein the first pad, the sealing washer, and the second pad are made of elastic insulating materials, and an inner periphery of the interior end of the sealing washer is smaller than an outer periphery of the pipe, and wherein an inner periphery of the exterior end of the sealing washer is larger than the outer periphery of the pipe.

2. The pipe coupler according to claim 1, wherein the tie ring is made of a material made by compressing and molding powder of a metal or metal oxide and by then sintering a molded material under a melting temperature.

3. The pipe coupler according to claim 1, wherein the tie ring has tetrahedron-shaped guides equally spaced apart from each other in such a manner as to protrude from an inner periphery of the tie ring.

4. The pipe coupler according to claim 1, wherein the second pad has the locking portion protruding inward from one side of the rounded stepped surface of the second pad in such a manner as to be inserted into the through hole for dimensional compatibility of the tie ring, and the locking portion is extended to a front end direction of the second pad.

* * * * *